(12) United States Patent
Goodson

(10) Patent No.: US 9,108,210 B1
(45) Date of Patent: Aug. 18, 2015

(54) GARDEN HOSE NOZZLE WITH SWIVEL AND LOCK

(71) Applicant: Marcus D. Goodson, Fort Myers, FL (US)

(72) Inventor: Marcus D. Goodson, Fort Myers, FL (US)

( * ) Notice: Subject to any disclaimer, the term of this patent is extended or adjusted under 35 U.S.C. 154(b) by 0 days.

(21) Appl. No.: 14/246,256

(22) Filed: Apr. 7, 2014

(51) Int. Cl.
*B05B 15/06* (2006.01)
*B05B 12/00* (2006.01)
*B05B 9/01* (2006.01)
*F16L 27/08* (2006.01)

(52) U.S. Cl.
CPC ............... *B05B 15/065* (2013.01); *B05B 9/01* (2013.01); *B05B 12/002* (2013.01); *B05B 15/066* (2013.01); *F16L 27/0861* (2013.01)

(58) Field of Classification Search
CPC ...... B05B 1/3026; B05B 9/01; B05B 12/002; B05B 15/065; B05B 15/066; B05B 15/067; F16L 27/0804; F16L 27/0828; F16L 27/0861; F16L 33/2071
See application file for complete search history.

(56) References Cited

U.S. PATENT DOCUMENTS

| 4,500,119 | A | * | 2/1985 | Geberth, Jr. | 285/276 |
| 5,671,954 | A | * | 9/1997 | Cheramie | 285/281 |
| 6,050,508 | A | * | 4/2000 | Fan | 239/587.1 |
| 6,199,227 | B1 | * | 3/2001 | Chen | 4/615 |
| 8,985,484 | B2 | * | 3/2015 | Eley et al. | 239/525 |

* cited by examiner

*Primary Examiner* — Ryan Reis
(74) *Attorney, Agent, or Firm* — Ronald E. Smith; Smith & Hopen, P.A.

(57) ABSTRACT

An apparatus providing relative rotation between a garden hose and a hand-held nozzle includes a nozzle main body and a fluid connection member that engages the hose. A lower saw gate is mounted within the fluid connection member and rotates with it. An upper saw gate is mounted within the nozzle main body and rotates with it. A spring urges the upper saw gate to bear against the lower saw gate. A plurality of teeth is formed in the lower saw gate and a mating plurality of teeth is formed in the upper saw gate. The spring holds the lower and upper saw teeth in engagement with one another when a user rotates the nozzle main body. The user squeezes a pivotally mounted handle to overcome the bias. The teeth disengage from one another, allowing the inherent bias of the hose to return the hose to its position of repose.

9 Claims, 2 Drawing Sheets

GARDEN HOSE NOZZLE WITH SWIVEL AND LOCK

BACKGROUND OF THE INVENTION

1. Field of the Invention

This invention relates to nozzles of the type used with garden hoses. More particularly, it relates to a nozzle that can be rotated by the user with respect to the garden hose without causing kinking in the garden hose.

2. Brief Description of the Related Art

It is well-known that garden hoses forms kinks when the user rotates the nozzle during ordinary use. A kink can cut off water flow. About the only way to remove a kink is to leave the hose as it is and to rotate the nozzle until the kink is gone.

U.S. Pat. No. 5,671,954 to Cheramie discloses a swivel connector for nozzles and garden hoses. The swivel connector has an inner ring seal member in the form of a tube with first and second flanges extending from the opposite ends of the tube. The flanges are formed of a compressible and resilient material. The novel Cheramie structure further includes a first swivel member also of tubular construction having a groove formed in a first end that receives the first flange that extends from the inner ring seal member. A second end of the first swivel member engages the water-discharging end of a garden hose. A second swivel member of tubular construction also has a groove formed in a first end thereof that receives the second flange that extends from the inner ring seal member. The second end of the second swivel member engages a nozzle. A first sliding seal is formed between the first flange of the inner ring seal member and the groove formed in the first end of the first swivel member and a second sliding seal is formed between the second flange of the inner ring seal member and the groove formed in the second end of the second swivel member.

These siding seals can become worn with repeated use. Moreover, a tubular member having radially extending flanges that are resilient and compressible is not inexpensive to manufacture, nor are the two tubular swivel members having grooves formed in them to slidingly receive the resilient and compressible flanges.

A more robust construction that eschews the use of radially extending flanges and grooves for slideably receiving such flanges would represent progress in the art.

However, in view of the art considered as a whole at the time the present invention was made, it was not obvious to those of ordinary skill in the field of this invention how a more robust structure could be provided.

BRIEF SUMMARY OF THE INVENTION

The long-standing but heretofore unfulfilled need for an apparatus that enables a garden hose user to keep kinks out of garden hoses or to release kinks that have formed is now met by a new, useful, and nonobvious invention.

The novel apparatus provides kink-releasing relative rotation upon demand between a garden hose and a hand-held nozzle attached to a leading, water-discharging end of the garden hose. It includes a nozzle main body having a pistol grip structure that includes a pivotally mounted, engaged by the palm of the hand handle having a spring-loaded position of repose that prevents water flow through the nozzle main body.

A fluid connection member has internal threads formed therein that are adapted to releasably engage the leading end of an externally threaded garden hose. A lower saw gate is mounted within a hollow interior of the fluid connection member and is secured to the fluid connection member for conjoint rotation therewith. An upper saw gate is mounted within a hollow interior of the nozzle main body and is secured to the nozzle main body for conjoint rotation therewith.

The lower saw gate has a plurality of teeth that project upwardly therefrom and the upper saw gate has a plurality of teeth that depend downwardly therefrom.

An upper saw gate spring is disposed in bearing relation with a predetermined bias against the upper saw gate so that the upper saw gate teeth interlock with and engage the lower saw gate teeth and thus prevent relative rotation between the nozzle and the garden hose when the upper saw gate spring is in repose. The pivotally mounted handle and the upper saw gate are interconnected by means disclosed hereinafter so that upper saw gate spring is in repose when the pivotal handle is in repose, i.e., when no water is flowing through the hand-held nozzle, and the upper saw gate spring is under compression when the pivotal handle is not in repose, i.e., when water is flowing through the hand-held nozzle.

A water inlet channel and a water outlet channel are formed in the hollow interior of the nozzle main body. The water inlet channel is disposed in open fluid communication with the water outlet channel in substantially normal relation thereto, i.e., the water inlet channel is formed in the pistol-grip part of the main body and the water outlet channel is formed in the barrel part of the main body.

A groove is formed in the nozzle main body in circumscribing relation to the pistol grip part thereof. An annular sealing ring is positioned in the groove and in sealing relation to the fluid connection member. A bearing race is formed in the fluid connection member and in the pistol grip part of the nozzle main body and a plurality of ball bearings is positioned in the bearing race, thereby enabling relative rotational movement between the fluid connection member and the nozzle main body when the upper saw gate teeth are disengaged from the lower saw gate teeth, i.e., when the pivotally mounted handle and the upper saw gate spring are displaced from their respective positions of repose and water is flowing through the nozzle main body.

An upper saw gate lifter is the aforementioned means for interconnecting the pivotally mounted handle and the upper saw gate. It is provided in the form of an elongate straight rod and is positioned within the inlet water channel. A lifter roller surmounts the upper saw gate lifter and is positioned in the water outlet channel. A first or lower end of the upper saw gate lifter is securely engaged to the upper saw gate and a second or upper end of the upper saw gate lifter is securely engaged to the lifter roller. A lifter guide is positioned between the first and second ends of the upper saw gate lifter near the upper end of the water inlet channel. The lifter guide is a cylindrical member having a lumen that slidingly receives the upper saw gate lifter near the upper end of the upper saw gate lifter so that the upper saw gate lifter may move up and down along its longitudinal axis.

A nozzle spray rod is mounted in the water outlet channel and an annular detent circumscribes the nozzle spray rod. A nozzle spray rod bias means in the form of an actuator spring has a first end disposed in abutting relation to the nozzle main body and a second end disposed in abutting relation to the detent. The actuator spring is in repose when its opposite ends abut the nozzle main body and the detent respectively and no water flows through the nozzle when said actuator spring is in repose.

A recess is formed in the nozzle spray rod and the bias of the upper saw gate spring urges the lifter roller down a ramp into the bottom of the recess when the upper saw gate bias means is in repose, thereby urging the upper saw gate lifter downwardly. When a user activates the pivotally-mounted handle by applying pressure to it, the nozzle spray rod is displaced along its longitudinal axis against the bias of the actuator spring and the lifter roller rides the ramp upwardly, i.e., radially outwardly with respect to the bottom of the recess, thereby lifting the upper saw gate lifter and compressing the upper saw gate spring so that the upper saw gate teeth disengage from the lower saw gate teeth, thereby enabling relative rotation between the fluid connection member and the nozzle main body and enabling the inherent bias of a hose to untwist the hose. Thus it is understood that the upper saw gate lifter interconnects the actuator spring and the upper saw gate spring so that compression of the actuator spring by pivoting of the nozzle handle causes substantially simultaneous compression of the upper saw gate spring. Water flows through the nozzle main body only when both of said springs are compressed and water flow is prevented when both of those springs are in their respective positions of repose.

The novel structure further includes a fulcrum means formed integrally with the nozzle main body. The nozzle handle is pivotally mounted to the fulcrum means. The fulcrum means is off-center with respect to the nozzle handle so that an elongate part of the nozzle handle and a truncate part of the nozzle handle are disposed on opposite sides of the fulcrum means.

The elongate part of the nozzle handle is adapted to be engaged by a user's palm when the user's fingers grasp the pistol grip part of the nozzle main body. The above-mentioned detent is formed in the truncate part of the nozzle handle and engages the nozzle spray rod so that when the user applies pressure to the elongate part of the nozzle handle, the nozzle spray rod is displaced in a direction that loads the actuator spring so that the actuator spring returns to its position of repose when the pressure is released and so that the actuator spring moves toward the position of repose when the pressure is reduced but not released.

A nozzle spray rod guide is disposed in the water outlet channel and has a leading end held concentrically relative to the water outlet channel by the nozzle spray rod guide.

A water flow exit guide is mounted in the water outlet channel between an open, water-discharging end of the water outlet channel and the nozzle spray rod guide.

A thumb adjustment screw engages a proximal end of the nozzle spray rod so that the actuator spring is compressed by advancement of the thumb adjustment screw or decompressed by retraction of the adjustment screw after such advancement.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
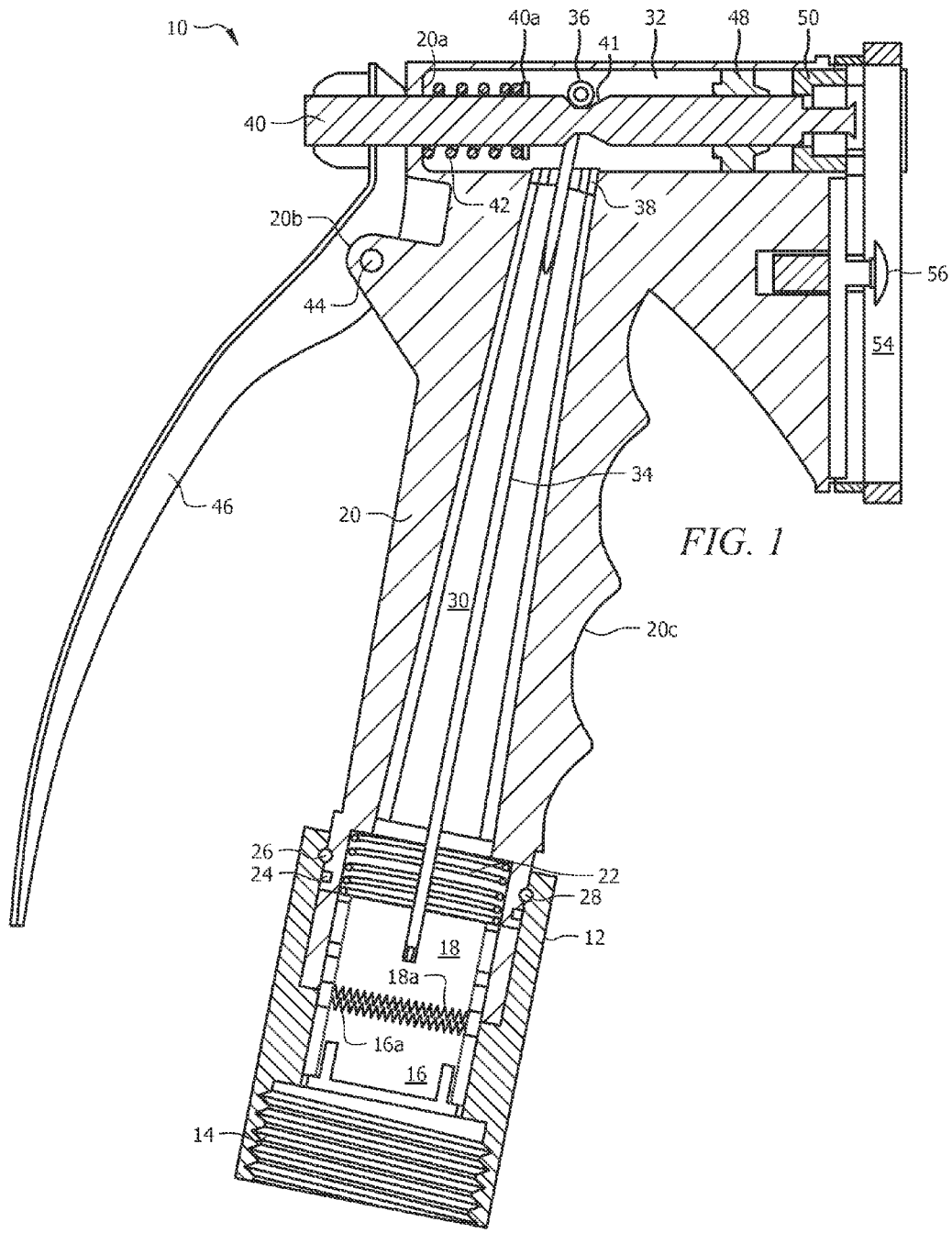
FIG. 1 is a first side elevation, sectional view of the novel structure.

The novel structure is in its position of repose and is denoted as a whole in FIG. 1 by the reference numeral 10.

Novel garden hose nozzle 10 is of the pistol-grip type and includes rotatably mounted fluid connection member 12 having internal threads 14 formed therein for releasable connection to the leading end of an externally threaded garden hose, not depicted.

Lower saw gate 16 is mounted within the hollow interior of fluid connection member 12 and does not rotate relative to fluid connection member 12. Upper saw gate 18 is mounted within the hollow interior of nozzle main body 20 and does not rotate relative to said nozzle main body. The bias of upper saw gate spring 22 bears against upper saw gate 18 so that said upper saw gate bears against lower saw gate 16.

Annular sealing ring 24 is positioned in a groove formed in nozzle main body 20 that circumscribes said nozzle main body and seals against fluid connection member 12.

A plurality of ball bearings 26 is positioned in bearing race 28 formed in a radially innermost surface of fluid connection member 12 and a radially outermost surface of nozzle main body 20. The bearings enable relative rotational movement between fluid connection member 12 and nozzle main body 20.

Water inlet channel 30 is formed in the interior of the pistol grip part of the nozzle main body 20 and is in open fluid communication with water outlet channel 32 which is formed in the barrel part of the nozzle main body. The axis of symmetry of water inlet channel 30 is generally perpendicular to the axis of symmetry of water outlet channel 32 but in a preferred embodiment the angle between said axes of symmetry is a little greater than ninety degrees (90°) as depicted for ergonomic purposes.

Upper saw gate lifter 34 is positioned within water inlet channel 30, preferably in coincidence with the axis of symmetry of said water inlet channel. Said upper saw gate lifter is an elongate, straight rod having a first or lower end securely engaged to upper saw gate 18 and a second or upper end engaged to lifter roller 36. Lifter guide 38 is positioned between the first and second ends of upper saw gate lifter 34 at the upper end of water inlet channel 30. Lifter guide 38 is a cylindrical member having a lumen that slideably receives upper saw gate lifter 34 near its second, i.e., its upper end as drawn.

Nozzle spray rod 40 is mounted in water outlet channel 32. Annular detent 40a circumscribes said rod. A nozzle spray rod bias means in the form of actuator spring 42 has a first end disposed in abutting relation to wall 20a which is formed integrally with nozzle main body 20 and a second end disposed in abutting relation to said detent, thereby biasing nozzle spray rod 40 away from wall 20a. The distance between wall 20a and detent 40a is preselected so that actuator spring 42 is in repose when its opposite ends abut said wall and said detent.

Annular recess or crimp 41 is formed in nozzle spray rod 40 in substantial registration with lifter roller 36. The downward bias of upper saw gate spring 22 that urges upper saw gate 18 to bear against lower saw gate 16 urges upper saw gate lifter 34 to travel downwardly as drawn so that lifter roller 36 is positioned at the lowermost point of recess 41 when novel apparatus 10 is in its position of repose.

A pair of spaced apart mounting ears 20b, only one of which appears in the side elevation view of FIG. 1, is also integrally formed with nozzle main body 20. Each mounting ear is apertured to receive pin 44 which also extends through a bore formed in nozzle trigger handle 46 so that said handle is pivotal about said pin. Mounting ears 20b thus provide a fulcrum and handle 46 serves as a lever that pivots about said fulcrum.

Fulcrum 20b is not centered with respect to the lever 46 so that an elongate, gently curved part 46a of nozzle trigger handle 46 abuts a user's palm when the user's fingers are received within finger-receiving notches 20c formed in the pistol grip part of said nozzle main body 20.

Figure 2:
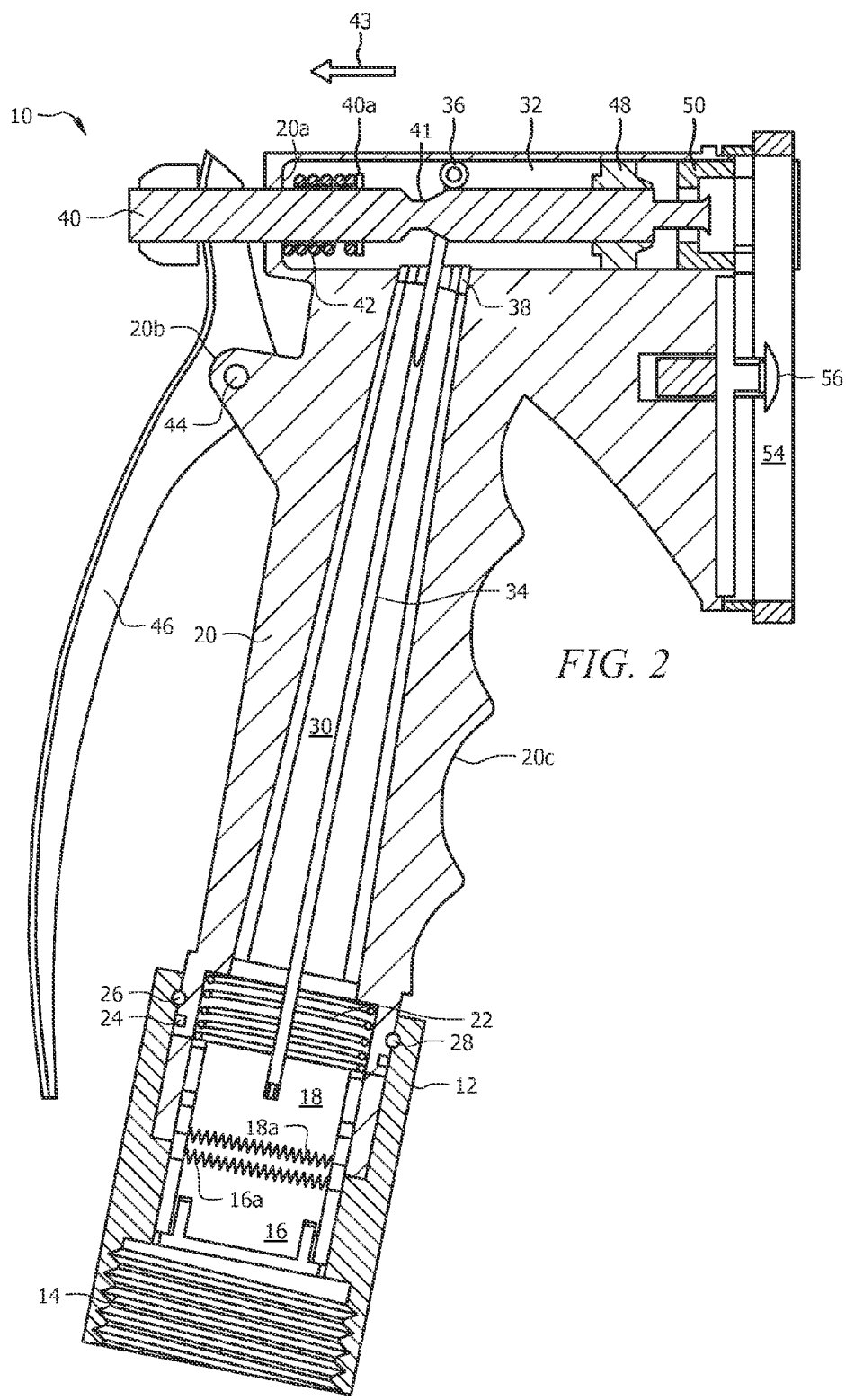
FIG. 2 is a second side elevation, sectional view of the structure depicted in FIG. 1.

A truncate part 46b of lever 46 on the opposite side of fulcrum 20b has a detent 46c formed therein that engages nozzle spray rod 40 so that when a user applies pressure to elongate curved part 46a of handle 46, said rod is displaced in the direction indicated by directional arrow 43 in FIG. 2. Such displacement loads actuator spring 42 so that said spring returns to its position of repose when said pressure is released. Spring 42 also moves toward its position of repose when the pressure is reduced but not released.

The leading end of nozzle spray rod 40 is held concentrically relative to water outlet channel 32 by nozzle spray rod guide 48. Water flow exit guide 50 is also mounted in said water outlet channel and is positioned between the open end of said water outlet channel and said nozzle spray rod guide.

Thumb adjustment screw 52 engages the proximal end of said nozzle spray rod 40 and a user may compress actuator spring 42 by advancing said adjustment screw or may decompress said actuator spring by retracting said adjustment screw after such compression. Advancement of adjustment screw thus re-defines the position of repose of actuator spring 42, placing said actuator spring under load even when the user applies no pressure to elongate lever 46a.

Spray pattern selector 54 is rotatably mounted to nozzle main body 20 by retaining screw 56 and performs its function in a well-known way.

Lower saw teeth 16a are formed in lower saw gate 16 and mating upper saw teeth 18a are formed in upper saw gate 18. The bias of upper saw spring 22 is sufficient to hold teeth 16a and 18a in engagement with one another when the user rotates nozzle main body 20 about a longitudinal axis of said nozzle main body. Accordingly, the novel structure then functions in the same way as a conventional structure.

However, if the hose forms or begins to form a kink, the user applies manual pressure to handle 46, causing nozzle spray rod 40 to displace in the direction indicated by said directional arrow 43, which displacement drives lifter roller 36 out of the lowermost point of annular recess 41 until said lifter roller is substantially out of said recess. This upward travel of lifter roller 36 pulls upper saw gate lifter 34 upwardly and thus compresses upper saw gate spring 22 and separates upper saw gate teeth 18a from lower saw gate teeth 16a so that fluid connection member 12 to which the hose is connected may rotate freely, independent of nozzle main body 20, thereby removing the kink. The torsion created by the kink provides the force that unwinds the kink because the hose is inherently biased to return to its position of repose which includes no twisted areas. When the kink is removed, the user releases the pressure on handle 46. Actuator spring 42 drives nozzle spray rod 40 back to its position of repose and lifter roller 36 returns to the bottom of recess 41 and upper saw gate spring 22 drives upper saw gate teeth 18a back into engagement with lower saw gate teeth 16a.

The same parts appear in the exploded view of FIG. 2.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. An apparatus providing relative rotation between a garden hose and a hand-held nozzle attached to a leading, water-discharging end of said garden hose, comprising:
   a nozzle main body;
   a fluid connection member having internal threads formed therein, said internal threads adapted to releasably engage a leading end of an externally threaded garden hose;
   a lower saw gate mounted within a hollow interior of said fluid connection member and secured to said fluid connection member for conjoint rotation therewith;
   a plurality of lower saw gate teeth formed in said lower saw gate and projecting upwardly therefrom;
   an upper saw gate mounted within a hollow interior of said nozzle main body and secured to said nozzle main body for conjoint rotation therewith;
   a plurality of upper saw gate teeth formed in said upper saw gate and depending therefrom;
   an upper saw gate spring disposed in bearing relation with a predetermined bias against said upper saw gate when said upper saw gate spring is in repose so that said upper saw gate teeth engage said lower saw gate teeth and prevent relative rotation between said upper saw gate and said lower saw gate;
   a water inlet channel formed in a hollow interior of the pistol grip part of the nozzle main body and a water outlet channel formed in the hollow interior of the barrel part of the nozzle main body;
   said water inlet channel being disposed in open fluid communication with said water outlet channel in substantially normal relation thereto;
   a nozzle spray rod positioned within said water outlet channel;
   a nozzle spray rod actuator spring that urges said nozzle spray rod into a position of repose;
   a recess formed in said nozzle spray rod, said recess including a ramp extending from a radially innermost point of said recess to a radially outermost point of said recess;
   an upper saw gate lifter in the form of an elongate, straight rod positioned within said inlet water channel, said upper saw gate lifter having a lower end secured to said upper saw gate;
   a lifter roller surmounting said upper saw gate lifter, said lifter roller engaging said nozzle spray rod and being positioned within said radially innermost point of said recess when said upper saw gate spring is in repose and when said nozzle spray rod bias means is in repose;
   said lifter roller rolling up said ramp, traveling from said radially innermost point of said recess to said radially outermost point, when said nozzle spray rod bias means is compressed;
   said upper saw gate lifter being lifted from its position of repose as said lifter roller rolls up said ramp, said displacement of said upper saw gate lifter compressing said upper saw gate bias means and causing said upper saw gate teeth to disengage from said lower saw gate teeth so that said hose returns to a position of repose under its inherent bias when said upper saw gate teeth and lower saw gate teeth are disengaged from one another;
   said upper saw gate lifter returning to its position of repose under the bias of said upper saw gate bias means when said nozzle spray rod actuator spring is decompressed and returned to its position of repose;
   whereby no water flows through said water inlet channel and said water outlet channel when said upper saw gate bias means and said nozzle spray rod actuator spring are in their respective positions of repose;
   whereby water flows through said water inlet channel and said water outlet channel when said upper saw gate bias means and said nozzle spray rod bias means are under compression; and whereby kinks cannot form in said garden hose when water is flowing through said hand-held nozzle, or when water is not flowing but said actuator spring is compressed, because the upper and lower saw gate teeth are disengaged from one another and the fluid connection member is free to rotate relative to said nozzle main body; and whereby kinks that are formed in said garden hose are released by an inherent bias of the garden hose when said pivotally mounted handle is pressed to activate water flow.

2. The apparatus of claim 1, further comprising:

a groove formed in said pistol grip part of said nozzle main body in circumscribing relation to said nozzle main body;

an annular sealing ring positioned in said groove and in sealing relation to said fluid connection member.

3. The apparatus of claim 2, further comprising:

a bearing race formed in said fluid connection member and in said pistol grip part of said nozzle main body;

a plurality of ball bearings positioned in said bearing race;

said plurality of ball bearings enabling relative rotational movement between said fluid connection member and said nozzle main body when said upper saw gate teeth and said lower saw gate teeth are disengaged from one another.

4. The apparatus of claim 3, further comprising:

a lifter guide positioned between the first and second ends of said upper saw gate lifter at the upper end of said water inlet channel.

5. The apparatus of claim 4, further comprising:

a fulcrum means formed integrally with said nozzle main body;

a handle pivotally mounted to said fulcrum means;

said fulcrum being off-center with respect to said pivotally mounted handle so that an elongate part of said pivotally mounted handle and a truncate part of said pivotally mounted handle are disposed on opposite sides of said fulcrum;

whereby said elongate part of said pivotally mounted handle is adapted to be engaged by a user's palm when the user's fingers grasp said pistol grip part of said nozzle main body.

6. The apparatus of claim 5, further comprising:

a detent formed in said truncate part of said pivotally mounted handle that engages said nozzle spray rod so that when said user applies pressure to said elongate part of said pivotally mounted handle, said nozzle spray rod is displaced in a direction that loads said actuator spring so that said actuator spring returns to said position of repose when said pressure is released and so that said actuator spring moves toward said position of repose when said pressure is reduced but not released.

7. The apparatus of claim 6, further comprising:

a nozzle spray rod guide disposed in said water outlet channel;

said nozzle spray rod guide holding a leading end of said nozzle spray rod concentrically relative to said water outlet channel.

8. The apparatus of claim 7, further comprising:

a water flow exit guide mounted in said water outlet channel between an open, water-discharging end of said water outlet channel and said nozzle spray rod guide.

9. The apparatus of claim 8, further comprising:

a thumb adjustment screw disposed in engaging relation to a proximal end of said nozzle spray rod so that said actuator spring is compressed by advancement of said thumb adjustment screw or decompressed by retraction of said adjustment screw after such advancement.

\* \* \* \* \*